United States Patent

Mashima

[15] 3,699,247

[45] Oct. 17, 1972

[54] MULTIFUNCTIONAL VIDEO TAPE RECORDER OF HELICAL SCAN TYPE

[72] Inventor: Fumio Mashima, Osaka, Japan

[73] Assignee: Sango Electric Co., Ltd., Osaka-fu, Japan

[22] Filed: Sept. 30, 1970

[21] Appl. No.: 76,744

[30] Foreign Application Priority Data

Sept. 30, 1969 Japan ......................44/78322
Sept. 30, 1969 Japan ......................44/78323
Sept. 30, 1969 Japan ......................44/78324

[52] U.S. Cl. .......178/6.6 FS, 178/6.6 HS, 178/6.6 P, 178/6.6 SF, 179/100.2 T

[51] Int. Cl. .........G11b 5/52, G11b 5/56, H04n 5/78

[58] Field of Search ........178/6.6 FS, 6.6 SF, 6.6 HS, 178/6.6 P; 179/100.2 T

[56] References Cited

UNITED STATES PATENTS 3,539,712 11/1970 Stephens ..............178/6.6 SF
3,376,395 4/1968 Rumple ................178/6.6 FS
3,375,331 3/1968 Okazaki ...............178/6.6 FS

*Primary Examiner*—Howard W. Britton
*Attorney*—Brufsky, Staas, Breiner & Halsey

[57] ABSTRACT

There is provided a multifunctional video tape recorder of the helical scan type capable of performing normal recording and playback, slow-motion playback with the use of a video tape recorded in normal recording, long term recording and playback, accelerated motion playback with the use of a video tape recorded in long term recording, and still reproduction with the use of a video tape recorded in normal recording, without necessitating any separate, additional devices for each of these functions. To this end, there is incorporated means for causing the rotary heads to properly trace the specific recorded tracks in spite of the change in the tape transporting speed.

14 Claims, 9 Drawing Figures

Figure 1:
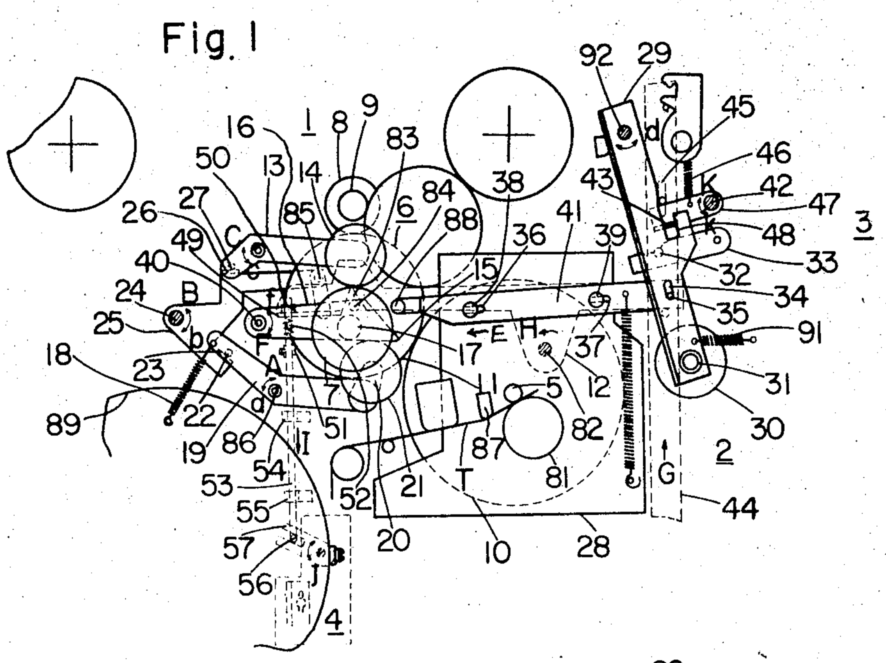

INVENTOR
FUMIO MASHIMA
BY
Burgess, Staas, Breiner & Halsey
ATTORNEY

PATENTED OCT 17 1972 3,699,247

SHEET 2 OF 5

INVENTOR

BY

ATTORNEY

INVENTOR

BY

ATTORNEY

INVENTOR

BY Burfsky, Haas, Raimer & Halaut
ATTORNEY

INVENTOR

BY Cushman, Darby & Cushman
ATTORNEY

MULTIFUNCTIONAL VIDEO TAPE RECORDER OF HELICAL SCAN TYPE

The present invention relates to a video tape recorder and, more particularly, to a helical scan video tape recorder of the rotary magnetic head system of novel construction capable of performing normal recording and playback, slow-motion playback with the use of a video tape recorded in normal recording, long term recording and playback, accelerated motion (quick-motion) playback with the use of a video tape recorded in long term recording, and still reproduction with the use of a video tape recorded in normal recording.

A video tape recorder capable of performing normal recording and playback and slow-motion playback without necessitating any separate device for slow-motion playback is heretofore well known and various types of this video tape recorder have been placed on the commercial market with success.

However, when long term playback, quick-motion playback or still reproduction is desired, one is compelled to take the picture scene appearing on a television receiver with the use of a movie camera, 8 mm or 16 mm, having a filming speed selector and, in a certain case, a recorded film must be reproduced with the use of a movie projector having a framing speed selector.

When one desires to install in his facilities such as house, factory or bank some watch means other than a watch dog or movie camera in view of the fact that he can see with his eyes what happened during the night time, he must watch an industrial TV receiver all the night which involves high personnel expenses.

The present invention has been made in view to eliminating these inconveniences and especially, in long term recording and playback, the video tape recorder of the present invention when provided with a No. 7 reel of magnetic tape (7 inches in diameter) can operate continuously for 7 hours.

Nevertheless, the provision of long term recording and playback, quick-motion playback and still reproduction in addition to normal recording and playback and slow-motion playback without necessitating any separate devices for each of these functions will bring about a great deal of amusement to the user and increase the commercial value of the video tape recorder.

Accordingly, one object of the present invention is to provide a helical scan video tape recorder of the rotary magnetic head system capable of performing;

a. normal recording and playback in which condition a magnetic tape or video tape is transported at the speed of V,
b. slow-motion playback in which condition the video tape is transported at the speed of $1/n\cdot V$ wherein $n$ is an integer in the range of from 3 to 12,
c. long term recording and playback in which condition the magnetic tape or video tape is transported at the same speed as in slow-motion playback,
d. quick-motion playback in which condition the video tape is transported at the same speed as in normal recording or playback,
e. still reproduction in which condition the transportation of the video tape is ceased.

Another object of the present invention is to provide a helical scan video tape recorder of the above system wherein a single head drum is provided by which each of the above mentioned recording and reproduction processes can be performed.

A further object of the present invention is to provide a helical scan video tape recorder of the above system wherein any one of the recording and reproduction processes can be selected by operating a changeover switch in a simple manner.

A still further object of the present invention is to provide a helical scan video tape recorder of the above system capable of reproducing through a monitor TV receiver the pictures of relatively high and uniform quality while said recorder is set in any of the reproduction processes.

A still further object of the present invention is to provide a helical scan video tape recorder of the above system wherein means for compensating the tape helix angle is provided whereby, when slow-motion playback with the use of a video tape recorded in normal recording or quick-motion playback with the use of a video tape recorded in long term recording is desired, the displacement of angle between the direction of scan of the heads and the lengthwise direction of each recorded track on the video tape incident to the change in the tape transporting speed can be adjusted to advantageously eliminate the tracking error.

A still further object of the present invention is to provide a helical scan video tape recorder of the above system wherein means is provided for recording control signals on the control track of a magnetic tape in long term recording at the same location a in normal recording.

A still further object of the present invention is to provide a helical scan video tape recorder of the above system wherein means for multiplying n times the frequency of each control signal recorded in normal recording or long term recording when long term playback or slow-motion playback is to be performed is provided whereby each magnetic head can be aligned with the starting end of each recorded track in long term playback or slow-motion playback.

A still further object of the present invention is to provide a helical scan video tape recorder of the above system wherein means for sampling odd and even fields alternatively at an interval of $(n-1)$ fields in long term recording is provided whereby not only interlaced quick-motion pictures can be obtained in normal playback, but also skewing of an upper portion of the raster resulting from irregularity of the interval between horizontal synchronizing signals at the instant each magnetic head commences to trace over one recorded track to another can be advantageously prevented.

A still further object of the present invention is to provide a helical scan video tape recorder of the above system capable of performing slow-motion reproduction even with the use of a commercially available, recorded video tape.

Figure 2:
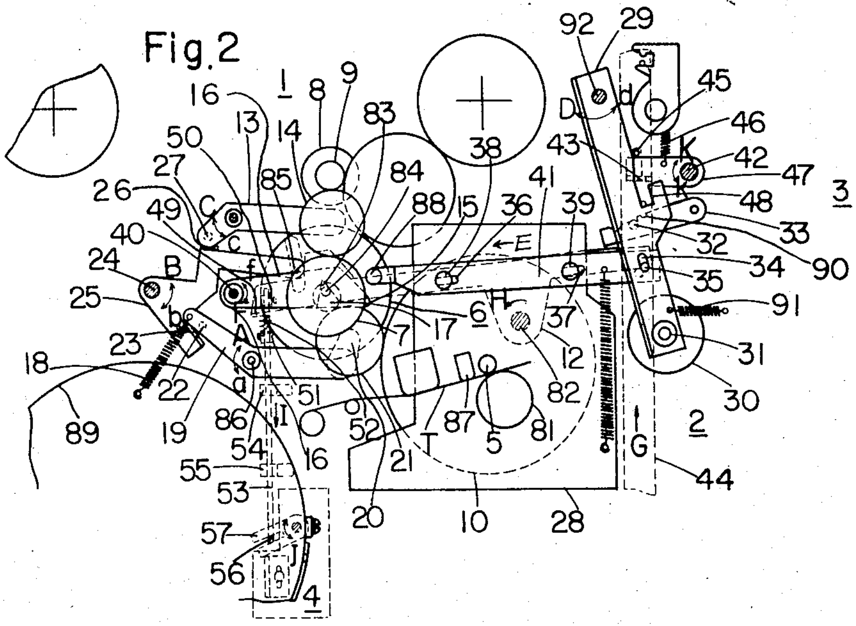
Figure 3:
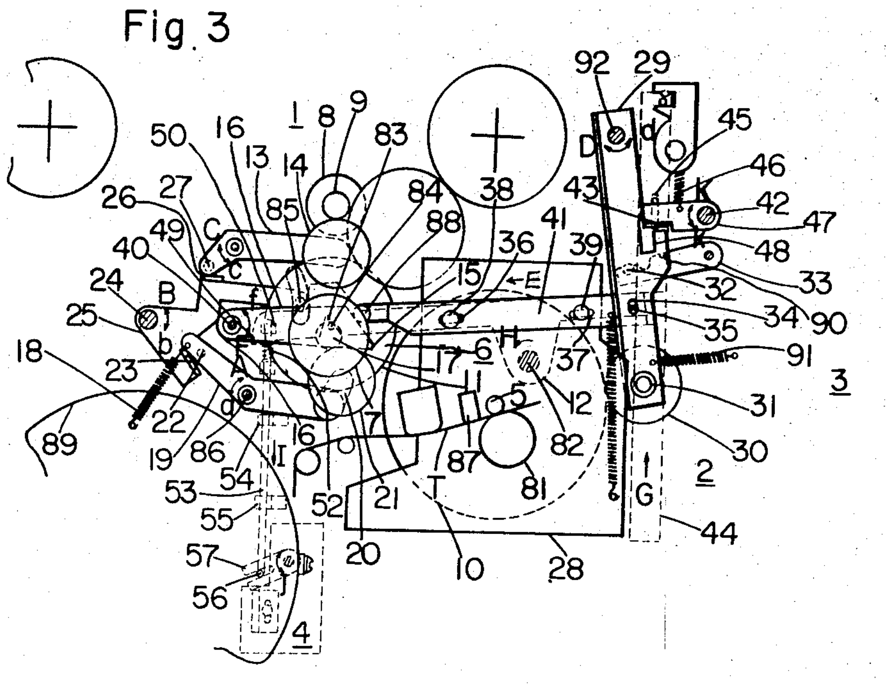
Figure 4:
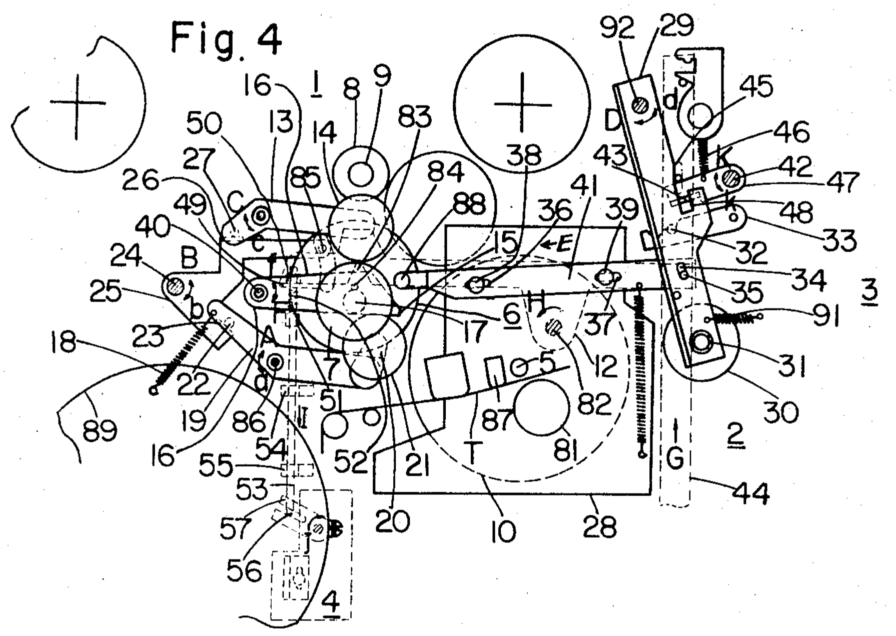
Figure 5:
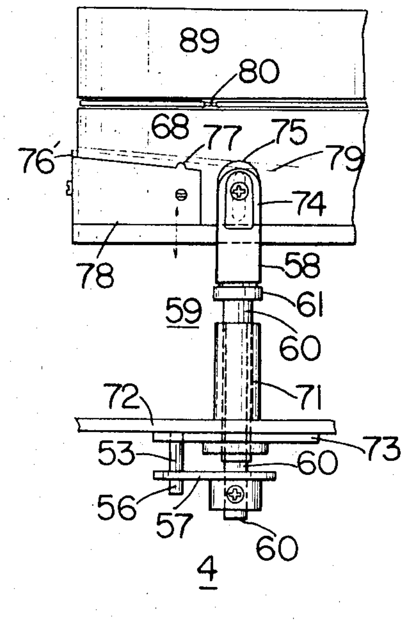
Figure 6:
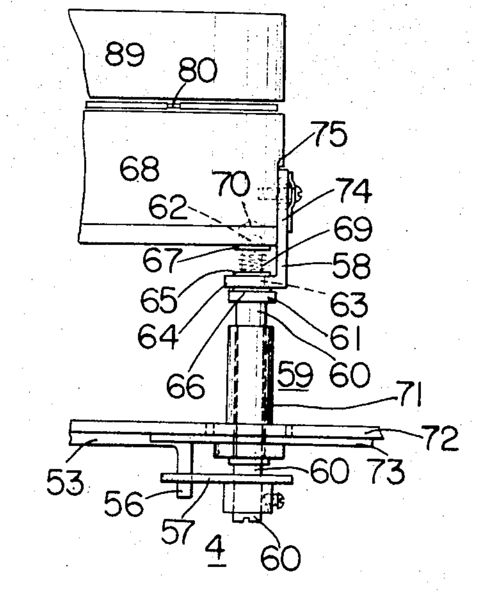
Figure 7:
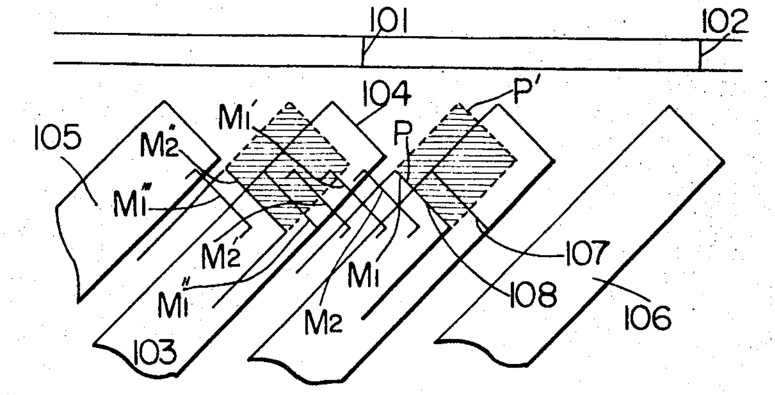
Figure 9:
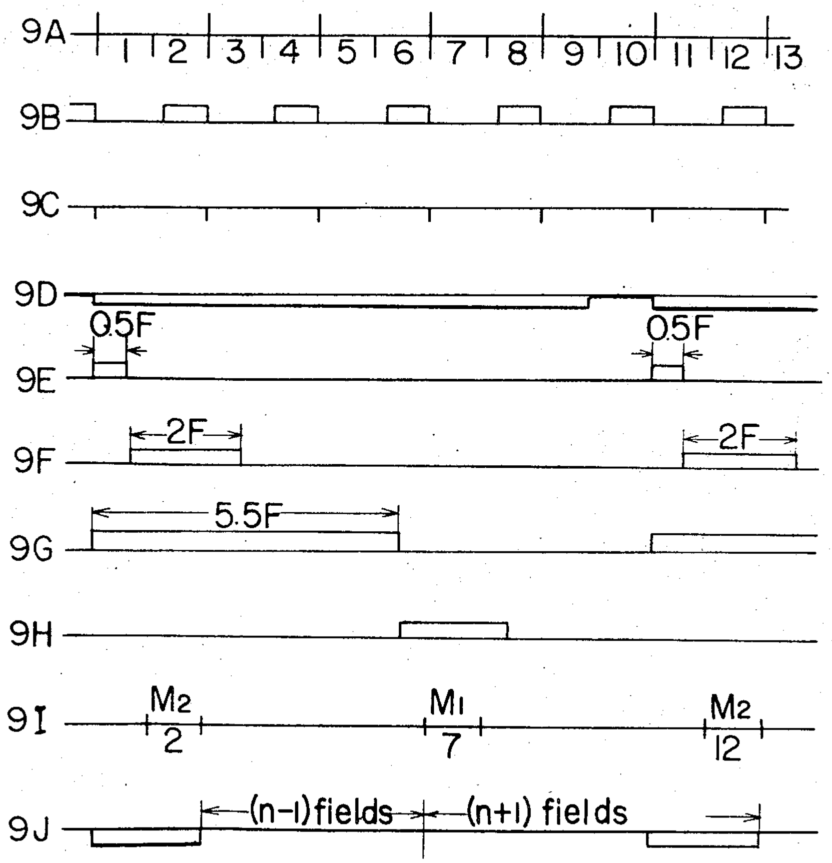
Figure 8:
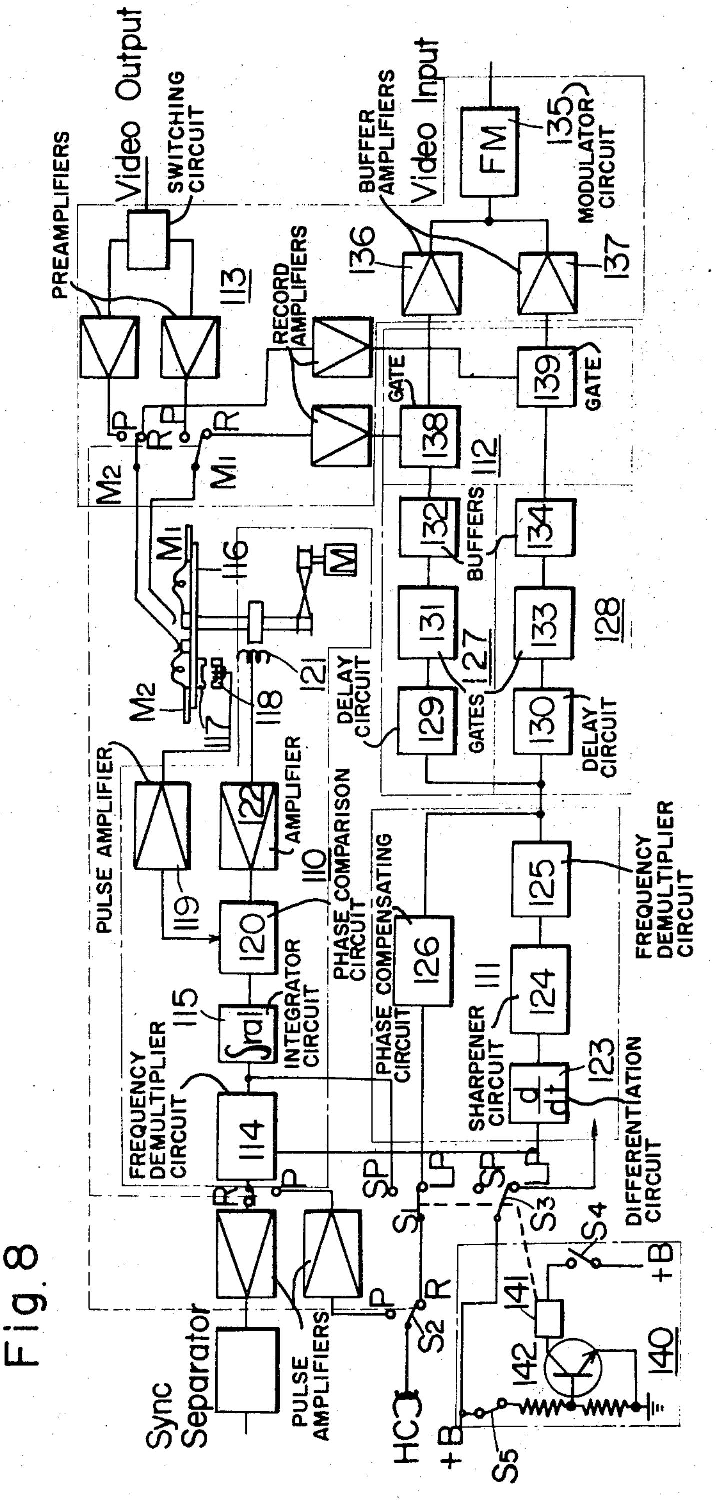

The present invention will be hereinafter fully described in conjunction with a preferred embodiment taken only for the purpose of illustration thereof with reference to the attached drawings, in which:

FIG. 1 is a plan view of a magnetic tape transportation mechanism for performing specific recording and reproduction processes in a video tape recorder according to the present invention, showing the associated parts of said transportation mechanism being in the normal playback position, FIG. 2 is a similar view to FIG. 1, showing said transportation mechanism being in the slow-motion playback or long term recording position, FIG. 3 is a similar view to FIG. 1, showing said transportation mechanism being in the still reproduction position, FIG. 4 is a similar view to FIG. 1, showing said transportation mechanism being in the neutral position, FIG. 5 is a front view of a tape passage compensating mechanism drivingly associated with said tape transportation mechanism of FIG. 1, FIG. 6 is a side view of FIG. 2, FIG. 7 shows on an enlarged scale a portion of the video tape for the purpose of illustration of the relation between video signals recorded on a video track in normal recording and that in long term recording with respect to the same control signals on a control track, FIG. 8 is a block diagram showing an electric circuitry associated only with normal recording and playback and long term recording, and FIG. 9 shows wave forms of outputs from essential portions of the electric circuitry shown in FIG. 5.

Referring now to FIG. 1 in which a plan view of the video tape transportation mechanism of a helical scan video tape recorder of the rotary magnetic head system embodying the present invention is shown, the video tape transportation mechanism broadly includes a tape speed change mechanism 1 for transporting the tape at the speed of V when in normal recording, normal playback or quick-motion playback, transporting the tape at the speed of $1/n \cdot V$ when in slow-motion playback, long term recording or long term playback and instantaneously stopping the transportation of the tape when in still reproduction, a fine tuning mechanism 2 operable when in still reproduction for positioning each recorded track on the tape in alignment with scans of the magnetic head assembly, a locking mechanism 3 for bring the video tape recorder in the still reproduction condition and a tape guide mechanism 4 for permitting the video tape to be transported while guided by said mechanism 4.

The tape speed change mechanism 1 further includes a first tape transportation system 6 for rotating a capstan 5 so as to feed the tape at the speed of V when in normal recording, normal playback or quick-motion playback and a second tape transportation system 7 for rotating the capstan 5 so as to feed the tape at the reduced speed of $1/n \cdot V$ ($n$: integer usually in the range of from 3 to 12) when in slow-motion playback, long term recording or long term playback.

The first tape transportation system 6 is comprised of a main idler wheel 11 engageable with a fly-wheel 10 of which the axis of rotation is served by the capstan 5 and also with a first pulley 8 of greater diameter than that of a second pulley 9. This main idler wheel 11 is so arranged as to be released from the engagement with the flywheel 10 and the first pulley 8 by means of a first crank lever 12 when in slow-motion playback.

The second tape transportation system 7 is comprised of a first idler wheel 14 rotatably mounted on one end of a first idler wheel carrier lever 13 of which an intermediate portion is pivoted to a chassis panel of the video tape recorder, a second idler wheel 17 rotatably mounted on a second idler wheel carrier lever 16, one end of said second idler wheel carrier lever 16 being pivoted to the chassis panel while the other end thereof is inclined to form an inclined end 15, a third idler wheel 21 rotatably mounted on a mounting member 20 which is in turn rotatably mounted on one end of a third idler wheel carrier lever 19 normally biased in the counterclockwise direction by a spring 18 connected with the other end of said third idler wheel carrier lever 19, an intermediate portion of said lever 19 being pivoted to the chassis panel, and an escapement lever 25 formed with a bent piece 23 engageable with a stop pin 22 rigidly secured to the third idler wheel carrier lever 19 at a position adjacent to the spring connected end, said escapement lever 25 in the instance as illustrated being biased in the clockwise direction as designated by $b$ in FIG. 1.

This escapement lever 25 is, in its normal condition, biased in the counterclockwise direction B by means of the first crank lever 12 so that the first idler wheel carrier lever 13 is pivoted in the clockwise direction C through a bent piece 26 formed in the escapement lever 25 in contact with a stop pin 27 formed in the first idler wheel carrier lever 13, whereby the first idler wheel 14 is disengaged from the second pulley 9. At this time, the third idler wheel carrier lever 19 formed with the stop pin 22 engageable with the bent piece 23 is pivoted in the clockwise direction A whereby the third idler wheel 21 is disengaged from the second idler wheel 17 and the flywheel 10.

The fine tuning mechanism 2 is basically comprised of a second crank lever 29 pivotally secured at its one end to a chassis panel 28 by means of a boss 92, a rotatable shaft 31, one end of which is formed into a fine tuning knob while the other end carrying a coaxially mounted idler wheel 30 is connected to the other lower end of the second crank lever 29, a spring biased cam plate 33 movable by said shaft 31 for adjustably positioning the second crank lever 29 between two positions around the boss 92 in cooperation with an engagement pin 32 integrally formed with an intermediate portion of said crank lever 29, and a release lever 41 slidably mounted on the chassis panel 28 by means of a pair of engagement pins 38 and 39 respectively engaged in a pair of slots 36 and 37 formed in said chassis panel, one end of said release lever 41 being formed with a projection 35 engaged in a slot 34 and the other end of said lever 41 being formed as a kicker end 88. When the crank lever 29 is pivoted in the direction of the arrow D, this release lever 41 is moved in the direction of the arrow E. At this time, the kicker end 88 of said release lever 41 kickes the inclined end 15 of the second idler wheel carrier lever 16, causing the latter to rotate in the direction of the arrow F around its pivot 40. Upon rotation of the second idler wheel carrier lever 16, the escapement lever 25 is moved so as to permit the third idler wheel carrier lever 19 to move in the direction of the arrow a and the first idler wheel carrier lever 13 to move in the direction of the arrow C, whereby the engagement between the first idler wheel 14 and the second pulley 9 of the motor and the engagement between the third idler wheel 21 and the flywheel 10 are respectively released.

The locking mechanism 3 for still reproduction is comprised of a restricting plate 47 normally biased in one direction by a spring 46, one end of said plate 47 being pivotally secured by the pivot 42 and the other end thereof being formed with a projection 43 engageable with a pin 45 formed about an intermediate portion of a first slidable member 44 operatively connected with a push-button (not shown) representative of "-slow-motion reproduction" or "long term recording," and a substantially U-shaped trap portion 48 formed in the second crank lever 29 for receiving therein the projection 43 of the restricting plate 47 when the latter is moved whereby the condition shown in FIG. 3 can be established.

The video tape guide mechanism 4 is comprised of, as clearly shown in FIG. 5 and FIG. 6, a connecting rod 53, a plurality of bearing member 54 and 55 for slidably guiding said connecting rod 53 therethrough, a U-shaped swingable member 57 swingable between a first position and a second position, and a guide structure 59 including a tape shifting unit 58 of L-shape provided about an upper end of said guide structure 59 for shifting said tape shifting unit 58 in the vertical direction within the range of 0.1 mm.

The connecting rod 53 extends between the U-shaped swingable member 57 and the first crank lever 12 rotatable in the direction of the arrow H as the first slidable plate 44 is moved in the direction of the arrow G, one end of said connecting rod 53 being inserted in a through hole, formed about a slantingly cut end 49 of the first crank lever 12, and loosely held therein by means of a pair of bosses 50 and 51 and a spring member 52 interposed between said bosses while the other end being bent to form an engaging portion 56 engaged in a hollow of the U-shaped swingable member 57 so as to swing the latter upon sliding movement of the connecting rod 53.

The guide structure 59 includes a boss 60 formed with threads of a pitch of about 0.6 mm. and carries the U-shaped swingable member 57, the L-shaped tape shifting unit 58 having a long section 74 and a short section 64 at right angles to said long section 74, said short section 64 being formed with a circular opening 63 through which a reduced diameter portion 62 extends from an upper flanged portion 61 of the boss 60, a spring 69 interposed between the upper surface of the short section 64 and the undersurface of a lower cylinder 68 of a single head drum through washers 65 and 67 respectively so as to hold the short section 64 in position between the flanged portion 61 and the washer 65 through a washer 66 in contact with the flanged portion 61 and a guide nut fitting member 73 for adjusting a fitting position of a guide nut 71 to a chassis panel 72 so as to permit the reduced diameter portion 62 to be engaged in an escapement hole 70 formed in the bottom of the lower cylinder 68 in alignment with the axis of said reduced diameter portion 62. The long section 74 of the tape shifting unit 58 is accommodated in a guide recess 75 formed on the peripheral surface of the lower cylinder 68, and positioned on the right-hand portion of a guide band 78 as shown in FIG. 2. In other words, the long section 74 is positioned on the trailing side of the lower cylinder 68 from which the tape fed around the lower cylinder 68 is separated on to a take-up reel (not shown). The guide band 78 has an upper side slanted toward said long section 74 and formed with support tips 76 and 77 for guiding the tape in contact with the lower side of said tape. When in slow-motion playback, still reproduction, long term recording or long term playback or quick-motion playback, the tip of the long section 74 is projected beyond the extension line 79 passing through the tips 76 and 77 whereby the tape is, during its transportation, guided by one of the support tips 76 and the tip of said long section 74 and, thus, the displacement of angle between the direction of scan of the heads and the lengthwise direction of each recorded track on the video tape incident to the change in the tape transporting speed can be adjusted to advantageously eliminate the tracking error.

Now that the details of the video tape transportation mechanism has been fully described, the operation thereof will be hereinafter described.

When in normal playback, the main idler 11 contacted with the first pulley 8 rotates the capstan 5 coaxial with the flywheel 10 at the same speed of V as in normal recording so that the video tape T is fed to a take-up reel (not shown) while being sandwiched between said capstan 5 and the pinch roller 81. However, since the tip of the tape shifting unit 58 is positioned below the extension line 79 passing through the support tips 76 and 77 at this time, the video tape is guided along the support tips 76 and 77 while the rotary heads trace the recorded tracks on the tape at the same angle with respect to each recorded track as in normal recording.

When in slow-motion playback or long term recording, the first crank lever 12 engaged with the first slidable plate 44 is rotated in the direction of the arrow H as said first slidable plate 44 is moved in the direction of the arrow G by means of a push-button or knob. As the first crank lever 12 is thus rotated around the shaft 82, a shaft 84 of the main idler wheel 11 engaged in a notch 83 of the first crank lever 12 is moved whereby the contact between the first pulley 8 and the flywheel 10 is released.

At the same time, the escapement lever 25 that has been restricted of its movement through the pin 85 is released so as to permit the third idler wheel carrier level 19 to rotate in the direction of the arrow *a* around its pivot 86 by the action of the spring 18, resulting in that the third idler wheel 21 mounted on the mounting member 20 which is in turn pivotally mounted on said third idler wheel carrier lever 19 is contacted to the flywheel 10.

While the third idler wheel 21 is thus contacted to the flywheel 10, said third idler wheel 21 is at the same time contacted to the second idler wheel 17 whereby the second pulley 9 connected with the drive shaft (not shown) of the motor can transmit its rotation to the capstan 5 in the order through the first idler wheel 14, the second idler wheel 17, the third idler wheel 21 and, finally, the flywheel 10 coaxially integral with said capstan 5. It will thus be understood that the video tape T can be fed by the capstan 5 at a relatively slow speed by which slow-motion playback or long term recording can be achieved.

While the second transportation system 7 is thus established as hereinbefore described, the connecting rod 53 is moved in the direction of the arrow I by the rotation of the first crank lever 12, causing the U-shaped swingable plate 57 to pivot in the direction of the arrow J. Accordingly, the boss 60 is screwed to elevate by the rotational angle with respect to one pitch of the threads formed on said boss 60, said rotational angle being determined by the connecting rod 53 moved in the direction of the arrow I. Upon elevation of said boss 60, the video tape shifting unit 58 is elevated with its tip beyond the extension line 79 whereby the running video tape is supported on the tip 76 and the tip of said unit 58 without necessitating the tip 77. Therefore, the relative scanning angle of the rotary heads with respect to each recorded track on the tape can be properly adjusted. However, in long recording, the video tracks recorded at an interval of $(n - 1)$ fields sampled on the tape while the latter is fed at the speed of $1/n \cdot V$ are adjusted into the parallel relation to that recorded in normal recording.

As the first slidable plate 44 is moved, the restricting plate 47 is disengaged from the pin 45 and subsequently rotated in the direction of the arrow K by the action of the spring 46 so that the engagement between the projection 43 and the U-shaped trap portion 48 can be released, enabling the second crank lever 29 to move around the pivot 92.

In slow-motion playback, the rotary heads 80 repeats to trace the same video track on the tape while the rotational phase of said heads 80 is constantly controlled by comparing an electric signal representative of the rotational phase of said heads and the slow-motion control signal which is an output of a slow-motion control head 87, a value of such repetation of trace by the rotary heads 80 being equivalent to a multiple of the reciprocal of a ratio of the tape speed in normal playback relative to the tape speed in slow-motion playback, i.e., a multiple of n, whereby a slow-motion playback signal can be obtained.

However, it should be noted that the rotational phase signal is generated by a detecting means which detects the rotational phase of a magnet means integrally disposed around a rotary head bearing shaft. It is also noted that the slow-motion control head 87 is adapted to read out signals on the second control track of the video tape, the number of said signals on the second control track being amplified to a value equivalent to the product of a multiple of n times the number of the first control signals recorded on the first control track of the tape, said first control signals being adapted to be read out when in normal playback.

Alternatively, the slow-motion control signal can be obtained from the control signals recorded on the control track of a magnetic tape when in normal recording, in such a manner as to multiply n times the frequency of each of said control signals recorded in normal recording.

The operation of the video tape transportation mechanism in still reproduction is fully described in the pending U.S. Pat. application, Ser. No. 857,358 filed Sept. 12, 1969, now U.S. Pat. No. 3,606,205, and, therefore, the details thereof is herein omitted.

FIG. 7 shows on an enlarged scale a portion of the video tape for the purpose of illustration of the relation between video signals recorded on a video track in normal recording and that in long term recording with respect to the same control signals on a control track.

Reference numerals 101 and 102 represent control signals generally recorded on the control track adjacent to and along one edge portion of the video tape for controlling the rotation of the two rotary heads during the normal playback process. Reference numeral 103 represents a recorded track by the first rotary head in register with the control signal 101, the first rotary head when in normal playback being generally controlled to position at the starting end 104 of the recorded track in register with the control signal 101 at the instant that the control signal 101 is read out.

Reference numeral 105 represents a recorded track by the second rotary head positioned on the right opposite side to the first rotary head with respect to the centrally disposed head bearing shaft, this recorded track 105 being subsequently formed by said second rotary head spaced at an angle of rotation of 180° from the first rotary head.

Reference numeral 106 represents a subsequently recorded track by the first rotary head in register with the following control signal 102 while reference numeral 107 represents a subsequently recorded track by the second rotary head.

An angle of inclination of each recorded track on the video tape relative to the direction of transportation of the video tape is, since each head 80 is rotated at the rate of 30 rotations per second, determined by the value of the tape speed and or a value of the angle between the scan path of the heads 80 relative to the lengthwise direction of the video tape. Accordingly, in the case where the video tape is transported at the speed of $1/n.V$, i.e., a fraction $1/n$ of the tape speed in normal recording, displacement will occur between the scan path of the rotary heads and each recorded track on the video tape, constituting a cause for so-called "-tracking error." In order to obviate such tracking error, the video tape guide mechanism as hereinbefore fully described with reference to FIG. 5 and FIG. 6 is provided in the video tape recorder in accordance with the teachings of the present invention.

Reference characters $M_1$, $M_2$, $M_1'$, $M_2'$, $M_1''$, $M_2''$ and $M_1'''$ represent traces formed by the first and second rotary heads, while the video tape is transported round the head drum in such a manner that said tape substantially half wrapped round said drum is upwardly shifted a value of $(n - 1)/n.L$, wherein L is a value of the track pitch, at the trailing end of said drum at which the running video tape is separated from said drum onto the take-up reel. Particularly, reference character $M_1$ and $M_2''$ represent the respective tracks recorded by first and second rotary heads at intervals of $(n - 1)$ fields in long term recording so that odd field and even field may be alternatively sampled at such intervals.

In the case where one frame is constituted with a pair of odd and even fields, the odd field and even field can be alternatively sampled at intervals of $(n - 1)$ fields by selecting an odd integer for n. This will be understood with reference to FIG. 7.

In the case where n is an even integer and the odd and even fields should be recorded at such intervals of $(n - 1)$ fields, a video track to be recorded by the second rotary head followed by the first rotary head must be such that the second rotary head records the video tape to form the video track at intervals of $(n - 1)$ fields after the first rotary head scans the video tape prior to the scanning movement of the second rotary head.

If $n$ is an even integer, a field recorded on the video tape by the scanning movement of the second rotary head at intervals of $(n-1)$ fields from the preceding field that has been recorded by the first rotary head prior to the scanning movement of the second rotary head will be the same odd or even field as said preceding field by the first rotary head. When quick-motion playback is intended while in this case, a monitor television will show non-interlaced pictures with relatively low vertical resolution.

In order to obviate the abovementioned defect, it may be contemplated that signals to be recorded by the second rotary head is one field delayed signals or that at least an auxiliary head is employed with respect to the corresponding head.

In the case where at least one auxiliary head is employed, the auxiliary head must be spaced by the width of one track ahead the second rotary head so that, while the video tape is transported at the speed of $1/n \cdot V$, video signals to be recorded on the video tape at a position $(n-2)$ fields apart from the preceding field recorded thereon by the first rotary head can be actually recorded at a position separated by a distance corresponding to a value of the intervals of $(n-1)$ fields, that is, at a position separated by a value of each normal track pitch from the preceding field. The details of this arrangement has been fully described in the abovementioned Patent Application.

In FIG. 7, an exemplary pattern of the recorded tracks is shown wherein the integer n is 5.

With reference to FIG. 7, when the video tape is transported at the speed of $1/5 \cdot V$ round the head drum while upwardly shifted at a distance of $(5-1)/5 \cdot L$ by the video tape guide mechanism 4 when in long term recording, the first rotary head $M_1$ that has been positioned at the starting end 104 of the recorded track 103 in normal recording or normal playback is brought to a position as indicated by P. Accordingly, in long term recording, the recorded track will be formed at a position spaced by a distance of $(5-1)/5 \cdot L$ in the parallel relation with respect to the recorded track 103 while the starting end 104 is also displaced as indicated by the hatched portion. When such recorded track is to be reproduced in normal playback wherein the video tape is transported at the speed of V, video signals may be intermitted for a while.

In order to avoid such intermittence of the video signals, in long term recording, recording should be commenced at a position P′ parallel to the extension line passing through other starting ends of the respective recorded tracks in parallel with the adjacent edge of the video tape. For this purpose, a servo control circuit for controlling the recording position of control signals and a sampling field circuit for video signal recording system are constructed as shown in FIG. 5 and, at the same time, the video tape is wrapped round the head drum to an extent greater than that in normal recording or normal playback, that is to say, 185° to 190°. However, such design practice may be omitted only if the video tape is wrapped therearound approximately 185° to 190° as hereinbefore described for ensuring formation of an overlapped portion at the time of switch-over from the first rotary head to the second rotary head.

In FIG. 8, of the rotary head servo control system and the video signal recording system, a circuit only associated with normal recording, normal playback and long term recording is shown in a block diagram. However, the circuit associated with slow-motion playback and its operation have been fully disclosed in the pending U.S. Pat. application Ser. No. 857,504 and, therefore, the details thereof are herein omitted.

The block diagram shown in FIG. 8 generally consists of a rotary head servo control section 110, a control signal compensating section 111, a sampling field section 112 and a video signal recording and reproduction section 113.

The rotary head servo control section 110 will undergo the substantially same function whenever the video tape recorder is in any process of normal recording, normal playback, long term recording, quick-motion playback and slow-motion playback, despite that different electric signals respectively representative of said process are applied thereto from different sources. This section 110 basically consists of a frequency demultiplier circuit 114 which may include a mono-stable multi-vibrator circuit, an integrator circuit 115 for integrating from said circuit 114 to give a triangular pulse wave or trapezoidal pulse wave, a rotational phase detector means 118 for detecting the rotational phase of a magnetic member 117 secured to the back of a rotatable arm 118 provided on its other side with a pair of the magnetic heads $M_1$ and $M_2$, a pulse amplifier circuit 119 for amplifying the output from said detector means 118, a phase comparison circuit 120 capable of receiving a phase signal to be compared from said amplifier circuit 119 and a reference signal from said integrator circuit whereby said phase signal is compared with said reference signal, and an amplifier circuit 122 for amplifying a value of error detected by the phase comparison circuit 120, the output signal from said circuit 122 being applied to a rotary head braking system 121 so as to regulate the rotation of the rotary magnetic head assembly. However, the construction and fundamental function of this rotary head servo control section 110 are well known in the art.

The control signal compensating section 111 basically consists of a differentiation circuit 123 for differentiating the output signal from the circuit 114 while generating the differentiate pulses, a wave form sharpener circuit 124 for sharpening the wave form of the differentiated pulses from the differentiation circuit 123, a $1/n$ frequency demultiplier circuit 125 for demultiplying the output from said waveform sharpener circuit 124 by the integer n and a control signal phase compensating circuit 126 including a mono-stable multi-vibrator circuit. The output signal from the control signal compensator circuit 126 is then applied to a control head Hc through a first switch $S_1$, the contact of which being connected with a terminal LP when in long term recording, and a second switch $S_2$, the contact of which being connected with a terminal R when in recording, whereby said output signal from said circuit 126 can be recorded on the video tape as control signals.

The sampling field section 112 includes two similar circuit groups; one is a first sampling field circuit group 127 capable of feeding a sampling field signal to the first rotary magnetic head $M_1$ and the other is a second sampling field circuit group 128 capable of feeding a sampling field signal to the second rotary magnetic head $M_2$.

The first sampling field circuit group 127 consists of a first pulse delay circuit 129 including a mono-stable multi-vibrator circuit having a quasi-stationary period of $(n+m+0.5)$ fields, a first gate signal circuit 131, a first buffer circuit 132 and a first gate circuit 138 which is operated by the output from the first gate signal circuit 131 so as to sample at intervals of $(n-1)$ fields video signals supplied from a FM modulator circuit 135 through a first buffer circuit 136, the video signals thus sampled by the first gate circuit 138 being then amplified and supplied to the first head $M_1$.

The second sampling field circuit group 128 consists of a second pulse delay circuit 130 including a mono-stable multi-vibrator circuit having a quasi-stationary period of $(m+0.5)$ fields, a second gate signal circuit 133, a second buffer circuit 134 and a second gate circuit 139, all of these being connected in series, said second gate circuit 139 being operated by the output from the second gate signal circuit 133 so as to sample at intervals of $(n-1)$ fields video signals supplied from the FM modulator circuit 135 through a buffer circuit 137, the video signals thus sampled by the second gate circuit 139 being then amplified and supplied to the second head $M_2$.

Reference numeral 140 represents a circuit for distincting the slow-motion playback operation from the long term recording operation, vice versa, this provision being necessitated because of the same tape speed of $1/n{\cdot}V$ effected in long term recording and slow-motion playback.

This circuit 140 includes a transistor 142 base-biased so as to operate in the linear or saturated area in recording, the collector of said transistor 142 being loaded with a relay for connecting the first switch $S_1$ and third switch $S_3$ respectively to the LP terminals and a fourth switch $S_4$ capable of, only when in slow-motion playback, supplying current to said transistor through a solenoid winding of said relay.

The information long term recording device according to the present invention will be hereinafter described with reference to FIG. 9 in which various waveforms of outputs of essential portions of the circuitry shown in FIG. 8 are shown.

In long term recording, the video tape is usually transported at the speed of $1/n{\cdot}V$ by means of the tape speed change mechanism shown in FIG. 1 while upwardly shifted by the tape guide mechanism shown in FIG. 5 and FIG. 6.

FIG. 9A shows the arrangement of vertical synchronizing signals separated from recording information signals such as video signals, the numerals representing the number of field in sequence.

The output of the demultiplier circuit 114 may typically represented by a rectangular wave shown in FIG. 9B. This output from the demultiplier circuit 114 is differentiated by the differentiation circuit 123 and, thereafter, converted into a pulse shown in FIG. 9C which is used to trigger the $1/n$ frequency demultiplier circuit 125 (See, FIG. 9D).

The output of the demultiplier circuit 125 is on one hand used as reference pulse for determining a sampling field of the sampling field circuit 112 and on the other hand as control compensating signal.

Since the long term recording device according to the present invention is designed such that the first rotary head $M_1$ records the seventh field while the second rotary head $M_2$ records the second field, the first pulse delay circuit 129 is imparted with the quasi-stationary period of a value equivalent to 5.5 fields while the second pulse delay circuit 130 is imparted with the quasi-stationary period of a value equivalent to 0.5 field.

FIG. 9E and FIG. 9F respectively show waveforms of the outputs of the first pulse delay circuit 129 and the second pulse delay circuit 130. 0.5 field on the both sides of the field to be sampled is provided for the purpose of preventing the picture from flickering due to a switching noise generated in the gate circuit and sampling gate may take place while either of the rotary heads rotates 180° between the adjacent fields to be sampled without contacting to the video tape.

FIG. 9G and FIG. 9H show the relationship of timing between the outputs of the first gate pulse the generating circuit and the second gate pulse generating circuit. It is noted that, only when the output from the $1/n$ frequency demultiplier circuit is recorded as control signal, the rotary head in quick-motion playback does not scan from the starting end of each recorded track as hereinbefore described. For this reason, the output from the $1/n$ frequency demultiplier circuit 125 is used to trigger the mono-stable multi-vibrator circuit 126 having the quasi-stationary period of a value equivalent to $(n+1)$ fields and the output from said circuit 126 is recorded as control signal.

Although the present invention has been fully described in conjunction with the preferred embodiment thereof with reference to the attached drawings, it should be noted that the present invention is not to be limited thereby, but modification and change may be apparent to those skilled in the art. For example, the present invention is applicable to a helical scan video tape recorder having one or more magnetic heads with slight modification or addition of the associated electric circuit. Moreover, the present invention is not limited to the video tape recorder of the type above referred to wherein the tape is wrapped approximately 180° around the head drum.

Accordingly, such modification and change would be construed as included in the scope and spirit of the present invention.

What is claimed is:

1. A helical scan video tape recorder of the rotary head system comprising;

means for causing the magnetic head to record in succession each video signal representative of one field on a video track of a magnetic tape while said tape is transported at a speed of V in its lengthwise direction, means for causing the magnetic head to reproduce in succession said video signal recorded on the video track by said first mentioned means while said tape is transported at the same speed of V, means for transporting the magnetic tape at a reduced speed of $1n{\cdot}V$, wherein n is an integer, means for compensating the relative angle between the scan path of the magnetic head and the lengthwise direction of the magnetic tape by upwardly shifting said tape to a position adjacent to a trailing side of said tape at which said tape is separated from contact between it and the peripheral surface of a cylinder drum, whereby the magnetic head scans recorded tracks in spite of the change of the tape speed, means for causing the magnetic head to record on the video track of a magnetic tape, video signals each composed of an odd field and an even field spaced at an interval of ($n - 1$) fields from said odd field while said tape is transported at a speed of $1n$·V, and means for causing the magnetic head to reproduce said video signal recorded on the video track by said fifth mentioned means by scanning said video track n times while said tape is transported at the same speed of $1/n$·V.

2. A video tape recorder according to claim 1, wherein said integer $n$ is an odd number.

3. A video tape recorder according to claim 1, wherein the number of fields recorded on each track is an integer representing more than 2 inclusive.

4. A video tape recorder according to claim 1, wherein said first mentioned means is adapted to record said video signal at an interval of 1 field.

5. A video tape recorder according to claim 1, further including means for recording control signals on the control track of a magnetic tape when said tape is transported at a speed of $1/n$·V, the interval between said control signals being of a value equivalent to the delayed interval of ($n - 1$) fields.

6. A video tape recorder according to claim 1, further including means for multiplying $n$ times the frequency of each of the control signals recorded when the magnetic tape is transported at the speed of V, so that the slow-motion control signals can be given when said tape is transported at a speed of $1/n$·V.

7. A helical scan video tape recorder of the rotary head system comprising;

means for causing the magnetic head to record each video signal representative of one field on a video track of a magnetic tape while said tape is transported at a speed of V in its lengthwise direction, means for causing the magnetic head to reproduce in succession said video signal recorded on the video track by said first mentioned means while said tape is transported at the same speed of V, means for transporting the magnetic tape at a reduced speed of $1/n·V$, wherein $n$ is an integer, means for compensating the relative angle between the scan path of the magnetic head and the lengthwise direction of the magnetic tape by upwardly shifting said tape to a position adjacent to a trailing side of said tape at which said tape is separated from the contact between it and the peripheral surface of a cylinder drum, whereby the magnetic head scans recorded tracks in spite of the change of the tape speed, means for causing the magnetic head to record on the video track of a magnetic tape, video signals each composed of an odd field and an even field spaced at an interval of ($n - 1$) fields from said odd field while said tape is transported at a speed of $1/n$·V, and means for causing the magnetic head to reproduce said video signal recorded on the video track by said fifth mentioned means while said tape is transported at a speed of V.

8. A video tape recorder according to claim 7, wherein said integer n is an odd number.

9. A helical scan video tape recorder of the rotary magnetic head system comprising;

means for causing the magnetic head to record each video signal representative of one field on a video track of a magnetic tape while said tape is transported at a speed of V in its lengthwise direction, means for causing the magnetic head to reproduce in succession said video signal recorded on the video track by said first mentioned means while said tape is transported at the same speed of V, means for transporting the magnetic tape at a reduced speed of $1/n$·V, wherein n is an integer, means for compensating the relative angle between the scan path of the magnetic head and the lengthwise direction of the magnetic tape by upwardly shifting said tape to a position adjacent to a trailing side of said tape at which said tape is separated from the contact between it and the peripheral surface of a cylinder drum, whereby the magnetic head scans recorded tracks in spite of the change of the tape speed, means for causing the magnetic head to record on the video track of a magnetic tape, video signals each composed of an odd field and an even field spaced at an interval of ($n - 1$) fields from said odd field while said tape is transported at a speed of $1/n$·V, means for causing the magnetic head to reproduce said video signal recorded on the video track by said fifth mentioned means by scanning said video track $n$ times while said tape is transported at the same speed of $1/n$·V.

10. A helical scan video tape recorder of the rotary head system comprising;

means for causing the magnetic head to record each video signal representative of one field on a video track of a magnetic tape while said tape is transported at a speed of V in its lengthwise direction, means for causing the magnetic head to reproduce in succession said video signal recorded on the video track by said first mentioned means while said tape is transported at the same speed of V, means for transporting the magnetic tape at a reduced speed of $1/n$·V, wherein n is an integer, means for compensating the relative angle between the scan path of the magnetic head and the lengthwise direction of the magnetic tape by upwardly shifting said tape to a position adjacent to a trailing side of said tape at which said tape is separated from the contact between it and the peripheral surface of a cylinder drum, whereby the magnetic head scans recorded tracks in spite of the change of the tape speed, means for causing the magnetic head to record on the video track of a magnetic tape, video signals each composed of an odd field and an even field spaced at an interval of ($n - 1$) fields from said odd field while said tape is transported at a speed of $1/n$·V, means for causing the magnetic head to reproduce the video signal recorded on the video track by said fifth mentioned means by scanning said video track in succession while said tape is transported at a speed of V, and means for causing the magnetic head to reproduce the video signal recorded on the video track by said first mentioned means by scanning said video track n times while said tape is transported at a speed of $1/n \cdot V$.

11. A video tape recorder according to claim 10, further including means for positioning each recorded track in alignement with scans of the magnetic head when in still reproduction.

12. A helical scan video tape recorder of the rotary head system comprising;

means for causing the magnetic head to record each video signal representative of one field on a video track of a magnetic tape while said tape is transported at a speed of V in its lengthwise direction, means for causing the magnetic head to reproduce in succession said video signal recorded on the video track by said first mentioned means while said tape is transported at the same speed of V, means for transporting the magnetic tape at a reduced speed of $1/n \cdot V$, wherein n is an integer, means for compensating the relative angle between the scan path of the magnetic head and the lengthwise direction of the magnetic tape by upwardly shifting said tape to a position adjacent to a trailing side of said tape at which said tape is separated from the contact between it and the peripheral surface of a cylinder drum, whereby the magnetic head scans recorded tracks in spite of the change of the tape speed, means for causing the magnetic head to record on the video track of a magnetic tape, video signals each composed of an odd field and an even field spaced at an interval of $(n - 1)$ fields from said odd field while said tape is transported at a speed of $1/n \cdot V$, means for causing the magnetic head to reproduce said video signal recorded on the video track by said fifth mentioned means by scanning said video track n times while said tape is transported at the same speed of $1/n \cdot V$, means for causing the magnetic head to reproduce the video signal recorded on the video track by said fifth mentioned means by scanning said video track in succession while said tape is transported at a speed of V, and means for causing the magnetic head to reproduce the video signal recorded on the video track by said first mentioned means by scanning said video track n times while said tape is transported at a speed of $1/n \cdot V$.

13. A helical scan video tape recorder of the rotary head system comprising;

means for causing the magnetic head to record each video signal of one frame consisting of two fields on the video track of a magnetic tape while said tape is transported at a speed of V in its lengthwise direction, means for causing the magnetic head to reproduce in succession said video signal recorded on the video track by said first mentioned means while said tape is transported at the same speed of V, means for transporting the magnetic tape at a reduced speed of $1/n \cdot V$, wherein n is an integer, means for compensating the relative angle between the scan path of the magnetic head and the lengthwise direction of the magnetic tape by upwardly shifting said tape to a position adjacent to a trailing said of said tape at which said tape is separated from the contact between it and the peripheral surface of a cylinder drum, whereby the magnetic head scans recorded tracks in spite of the change of the tape speed, means for causing the magnetic head to record on the video track of a magnetic tape, video signals each composed of an odd field and an even field spaced at an interval of $(n - 1)$ fields from said odd field while said tape is transported at a speed of $1/n \cdot V$, means for causing the magnetic head to reproduce said video signal recorded on the video track by said fifth mentioned means by scanning said video track n times while said tape is transported at the same speed of $1/n \cdot V$, means for causing the magnetic head to reproduce the video signal recorded on the video track by said fifth mentioned means by scanning said video track in succession while said tape is transported at a speed of V, means for stopping the transportation of the magnetic tape to permit the magnetic head to repeatedly trace the same recorded track, and means for causing the magnetic head to trace the same recorded track, formed by said first mentioned means, $n$ times while said tape is transported at a speed of $1/n \cdot V$.

14. A helical scan video tape recorder of the rotary head system comprising:

means for transporting a magnetic tape at a first speed of V, means for recording a video signal each field in succession by means of first and second rotary heads while the rotational phase of said first and second rotary heads is controlled in response to to a reference signal which is one-half divider output of the vertical synchronizing signal carried by said video signal, means for recording said one-half divider output on a control track of the magnetic tape in the lengthwise direction of said magnetic tape when in recording, means for reproducing, when in normal playback, said video signal each field in succession by means of each of said first and second heads while the rotational phase of said first and second heads is controlled in response to the control signal thus recorded on the control track, means for reproducing the magnetic tape while said magnetic tape is transported at a second speed of $1/n \cdot V$, wherein n is an odd number not less than 3 inclusive, means for compensating the relative angle between the scan path of the first and second heads and the lengthwise direction of the magnetic tape whereby the magnetic heads scan recorded tracks in spite of the change of the tape transportation speed, means for causing the heads to record on the video track of the magnetic tape, video signals each composed of an odd field and an even field at an interval of $(n-1)$ fields from said odd field, in response to ½ $n$ divider output of said vertical synchronizing signal while said tape is transported at the second speed and the rotational phase of said first and second heads is controlled by said first mentioned reference signal, means for recording on the control track of the magnetic tape said ½ $n$ divider output corresponding to recorded tracks each representative of two fields recorded by said seventh mentioned means after said ½ $n$ divider output has been delayed for a period of time corresponding to a certain number of control signals in the event that said field signals are recorded while the magnetic tape is transported at the speed of V, means for transporting the magnetic tape, which has been recorded, at the speed of V by means of said first mentioned means when in accelerated motion playback, means for controlling the rotational phase of said heads, when in accelerated motion playback, in response to a reference signal which is said control signal recorded on the control track of the magnetic tape, and means for reproducing said recorded tracks of said sampling signals by means of said first and second heads in a similar way as in normal playback to yield accelerated motion pictures, the rate of acceleration being two times that in recording.

* * * * *

PO-1050
(5/69)

UNITED STATES PATENT OFFICE
CERTIFICATE OF CORRECTION

Patent No. 3,699,247 Dated October 17, 1972

Inventor(s) Fumio Mashima

It is certified that error appears in the above-identified patent and that said Letters Patent are hereby corrected as shown below:

Assignee: SANYO ELECTRIC CO., LTD.
Osaka-fu, Japan

Signed and sealed this 13th day of March 1973.

(SEAL)
Attest:

EDWARD M.FLETCHER,JR.
Attesting Officer

ROBERT GOTTSCHALK
Commissioner of Patents